US010675929B1

(12) United States Patent
Baiz et al.

(10) Patent No.: US 10,675,929 B1
(45) Date of Patent: Jun. 9, 2020

(54) TIRE VALVE STEM COVER

(71) Applicants: Enrique J. Baiz, Davie, FL (US); Osvaldo Izquierdo, Homestead, FL (US)

(72) Inventors: Enrique J. Baiz, Davie, FL (US); Osvaldo Izquierdo, Homestead, FL (US)

( * ) Notice: Subject to any disclaimer, the term of this patent is extended or adjusted under 35 U.S.C. 154(b) by 39 days.

(21) Appl. No.: 16/141,745

(22) Filed: Sep. 25, 2018

(51) Int. Cl.
B60C 29/06 (2006.01)
F16K 27/08 (2006.01)
B60C 29/00 (2006.01)
F16L 55/115 (2006.01)

(52) U.S. Cl.
CPC ............ B60C 29/066 (2013.01); F16K 27/08 (2013.01); B60C 29/005 (2013.01); F16L 55/1152 (2013.01)

(58) Field of Classification Search
CPC ..... B60C 29/06; B60C 29/066; B60C 29/005; F16K 27/08; F16L 55/115; F16L 55/1152
USPC ............................................... 138/89.1–89.4
See application file for complete search history.

(56) References Cited

U.S. PATENT DOCUMENTS

| 1,254,975 | A | * | 1/1918 | Brown | B60C 29/06 138/89.2 |
| 1,473,032 | A | * | 11/1923 | Freedlander | B60C 29/06 138/89.1 |
| 1,659,751 | A | * | 2/1928 | Summers | B60C 29/06 138/89.3 |
| 2,453,001 | A | * | 11/1948 | De Stefano | B60C 29/06 138/89.1 |
| 2,597,546 | A | * | 5/1952 | Teepell | B60C 29/066 138/89.3 |
| 4,356,836 | A | * | 11/1982 | Wenger | F16K 27/08 137/232 |
| 5,630,687 | A | * | 5/1997 | Robinson | F16K 27/08 411/372.6 |
| 8,960,238 | B2 | * | 2/2015 | Schomann | B60C 29/066 138/89.3 |

* cited by examiner

Primary Examiner — Patrick F Brinson
(74) Attorney, Agent, or Firm — Quickpatents, LLC; Kevin Prince

(57) ABSTRACT

A valve stem cover includes a cylindrical cap open at a bottom end thereof and threaded with threads on an inside surface thereof. The cylindrical cap is adapted for threaded engagement with a threaded tire valve stem that projects through a wheel rim. A skirt projects downwardly from the bottom end of the cylindrical cap and is adapted to cover substantially a lower portion of a threaded tire valve stem that projects through the wheel rim. A decorative top portion projects upwardly from a top end of the cylindrical cap and can be removable for interchangeability.

4 Claims, 4 Drawing Sheets

TIRE VALVE STEM COVER

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

The present invention relates generally to wheel air valve stem caps found on land vehicles, and more specifically to an air valve stem cap that protects a valve stem cap against dust, weather elements & road debris encountered when the land vehicle is in motion.

DISCUSSION OF RELATED ART

Air valve stem caps have been used in land vehicles for many years. Typically, an air valve stem cap is installed over a valve stem to protect the air valve on top of the valve stem.

One primary problem with conventional air valve stem caps covers is that they are decorative caps and they are not designed to protect the valve stem itself, and in fact they can end up damaging the valve stem itself. Such caps only protect the air valve portion of the air valve stem assembly, leaving the stem portion of the air valve unprotected and vulnerable to dust, weather elements and road debris that can cause damage to the valve stem assembly.

While regular valve stem air caps are suitable to the purpose they address, they are not suitable for reducing any potential valve stem damage due to dust, weather elements and road debris. In these respects, the air valve stem cap invention substantially departs from the conventional concepts and designs of traditional valve stem caps, and in doing so provides an apparatus for the purpose of a complete air valve stem assembly that protects a land vehicle valve stem cap against dust, weather elements and road debris.

SUMMARY OF THE INVENTION

The present device is a valve stem cover that includes a cylindrical cap open at a bottom end thereof and threaded with threads on an inside surface thereof. The cylindrical cap is adapted for threaded engagement with a threaded tire valve stem that projects through a wheel rim.

A skirt projects downwardly from the bottom end of the cylindrical cap and is adapted to cover substantially all of the threaded tire valve stem that projects through the wheel rim. Preferably the skirt is integrally formed with the cylindrical cap.

A decorative top portion projects upwardly from a top end of the cylindrical cap. In some embodiments, the decorative top portion includes a knurled surface to facilitate gripping of the decorative top portion to unscrew or otherwise detach the decorative top portion from the cylindrical cap. In the first embodiment the decorative top portion is integrally formed with the cylindrical cap.

In use, with the cylindrical cap threadedly fixed with the threaded tire valve stem, the skirt covers substantially the exposed threaded tire valve stem projecting through the wheel rim, thereby protecting the threaded tire valve stem from road hazards such as dirt, debris and the like.

In a second embodiment, the cylindrical cap includes a threaded shaft projecting upwardly from the top end thereof. The decorative top portion in such an embodiment includes a cooperative threaded aperture in a bottom end thereof. As such the decorative top portion is interchangeable on the cylindrical cap. In such an embodiment, the decorative top portion can further include a second skirt projecting downwardly from the bottom end to cover at least a portion of the cylindrical cap when the decorative top portion is fully engaged with the threaded shaft.

While the threaded shaft and the cooperative threaded aperture represent one type of fastening mechanism that is preferred, clearly the decorative top portion could be attached to the cylindrical cap with some other fastening mechanism known in the art, such as a friction-fit post and recess (not shown), preferably having an elastomeric O-ring contacting the post and recess to increase the force required to overcome friction therebetween. Such a mechanism would allow the user to simply push the decorative top portion onto the post of the cylindrical cap or pull the decorative top portion off of the post of the cylindrical cap without using a turning or screwing action. A pair of strong magnets (not shown), one in the top end of the cylindrical cap and one in the bottom end of the decorative top portion could also be used, for example.

The present invention is a valve stem cover that substantially completely covers the threaded tire valve stem that projects through a wheel rim, protecting the valve stem from dust, debris, dirt and other road hazards. The present device is adjustable such that it can cover valve stems of varying lengths and still be effective. Further, the present invention allows for a variety of different decorative top portions to be interchanged as desired by the user. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
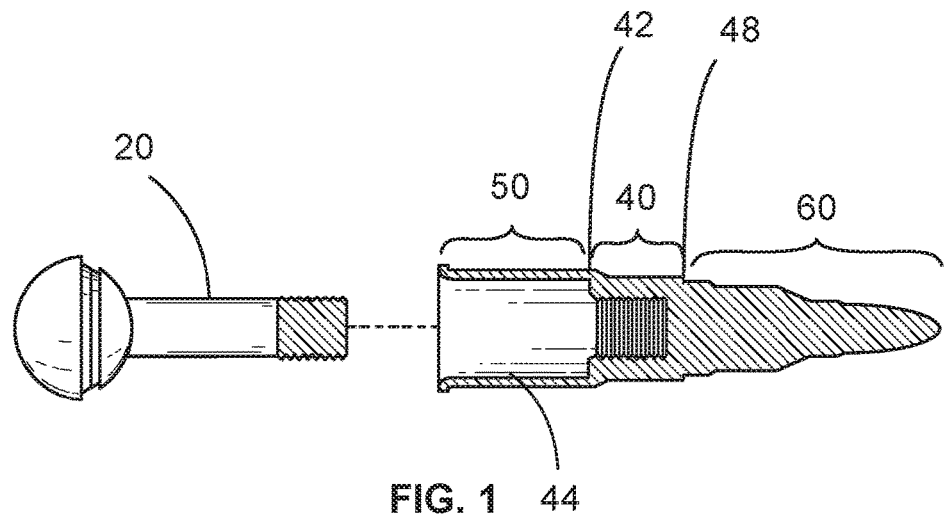
FIG. 1 is a cross-sectional view of a first embodiment of the invention taken through a longitudinal axis of the valve stem cover.

The present invention is a valve stem cover 10 for a threaded tire valve stem 20 projecting through a wheel rim 30, such as a tire valve stem 20 of an automotive or bicycle wheel rim 30 for example. FIG. 1 illustrates a first embodiment of the valve stem cover 10 that includes a cylindrical cap 40 open at a bottom end 42 thereof and threaded with threads 50 on an inside surface 44 thereof. The cylindrical cap 40 is adapted for threaded engagement with the threaded tire valve stem 20 and is preferably made from a rigid or semi-rigid metallic or plastic material from an injection-molding, casting, or milling process.

A skirt 50 projects downwardly from the bottom end 42 of the cylindrical cap 40 and is adapted to cover substantially all of the threaded tire valve stem 20 that projects through the wheel rim 30. Preferably the skirt 50 is integrally formed with the cylindrical cap 40 and made from the same rigid or semi-rigid metallic or plastic material.

Figure 4:
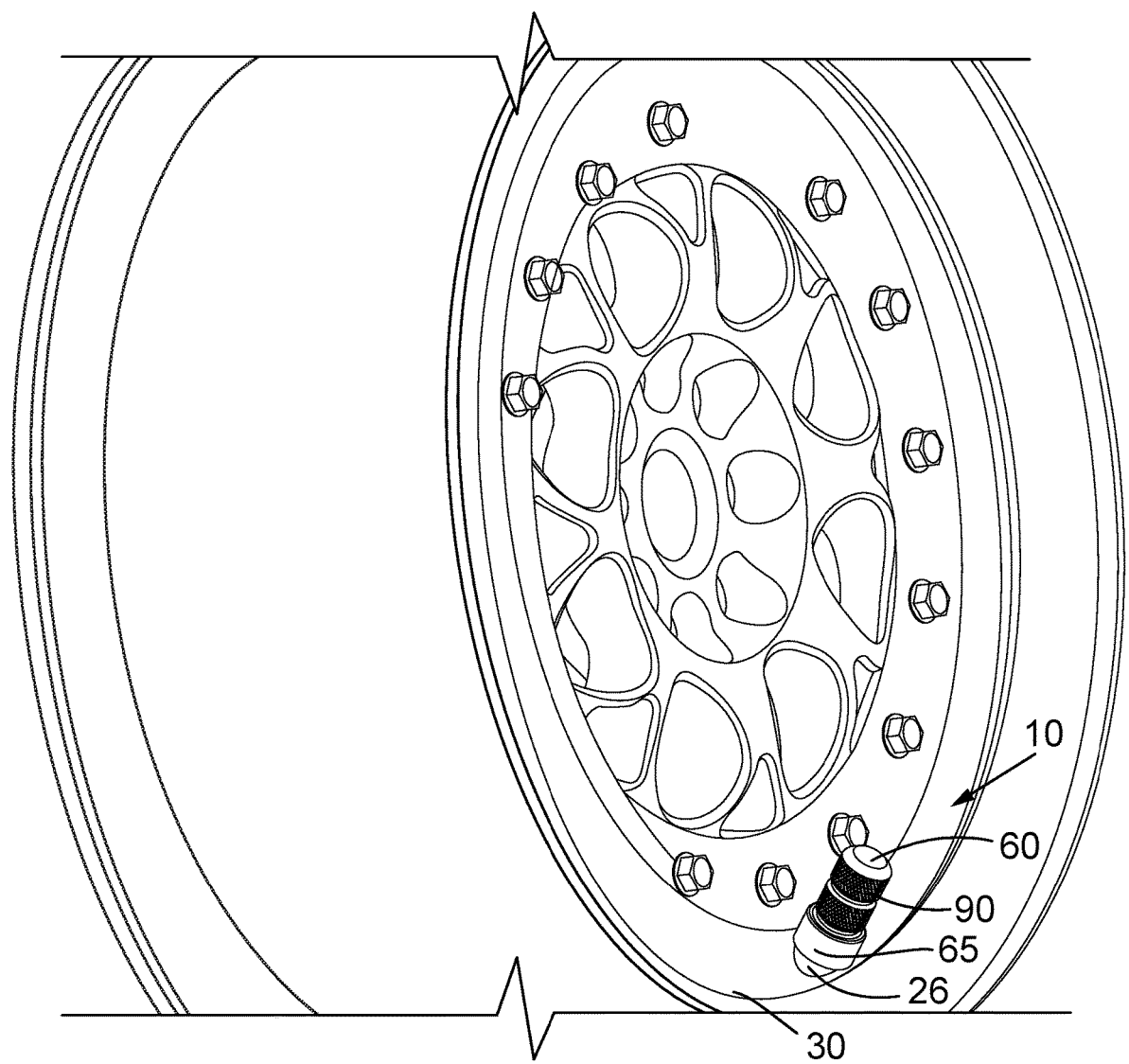
FIG. 4 is a perspective view of a third embodiment of the invention.
Figure 5:
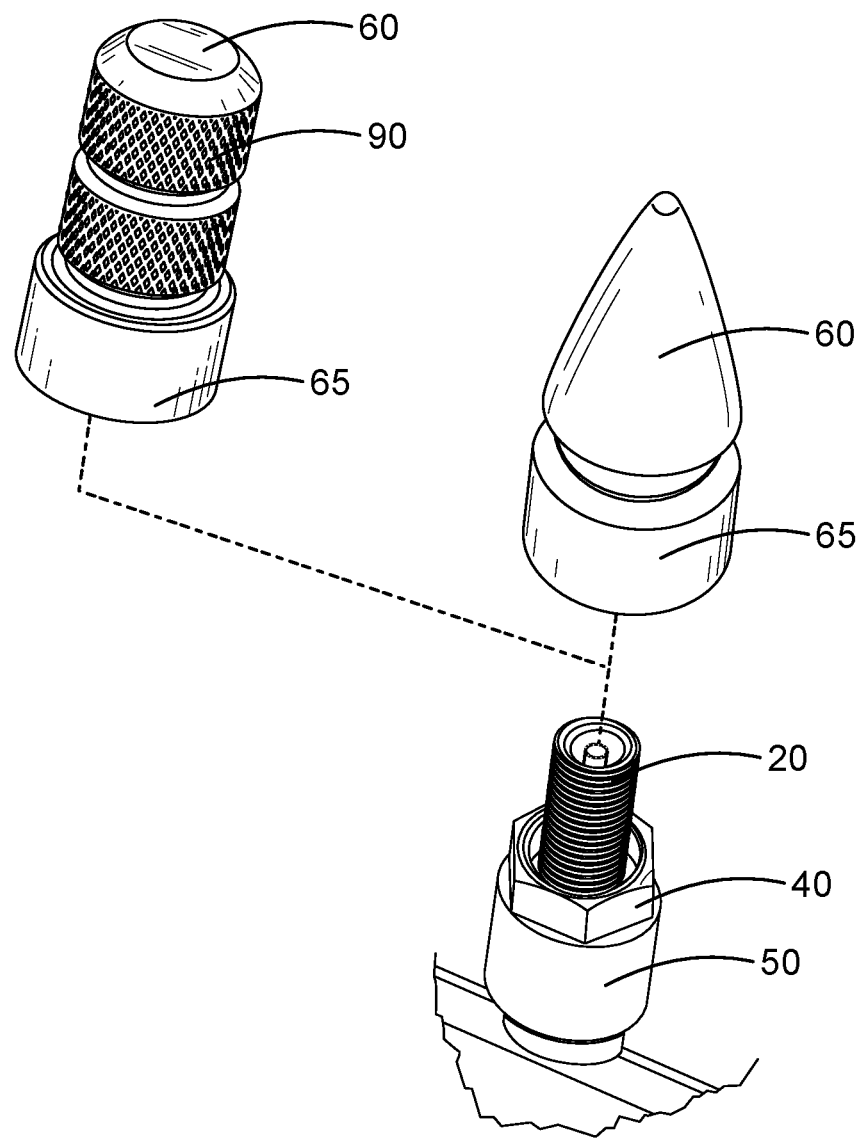
FIG. 5 is an enlarged, exploded perspective view of the third embodiment of the invention.

A decorative top portion 60 projects upwardly from a top end 48 of the cylindrical cap 40. In some embodiments, the decorative top portion 60 includes a knurled surface 90 (FIGS. 4 & 5) to facilitate gripping of the decorative top portion 60 to unscrew or otherwise detach the decorative top portion 60 from the cylindrical cap 40. In the first embodiment the decorative top portion 60 is integrally formed with the cylindrical cap 40.

In use, with the cylindrical cap 40 threadedly fixed with the threaded tire valve stem 20, the skirt 50 covers substantially the exposed threaded tire valve stem 20 projecting through the wheel rim 30, thereby protecting the threaded tire valve stem 20 from road hazards such as dirt, debris and the like.

Figure 2:
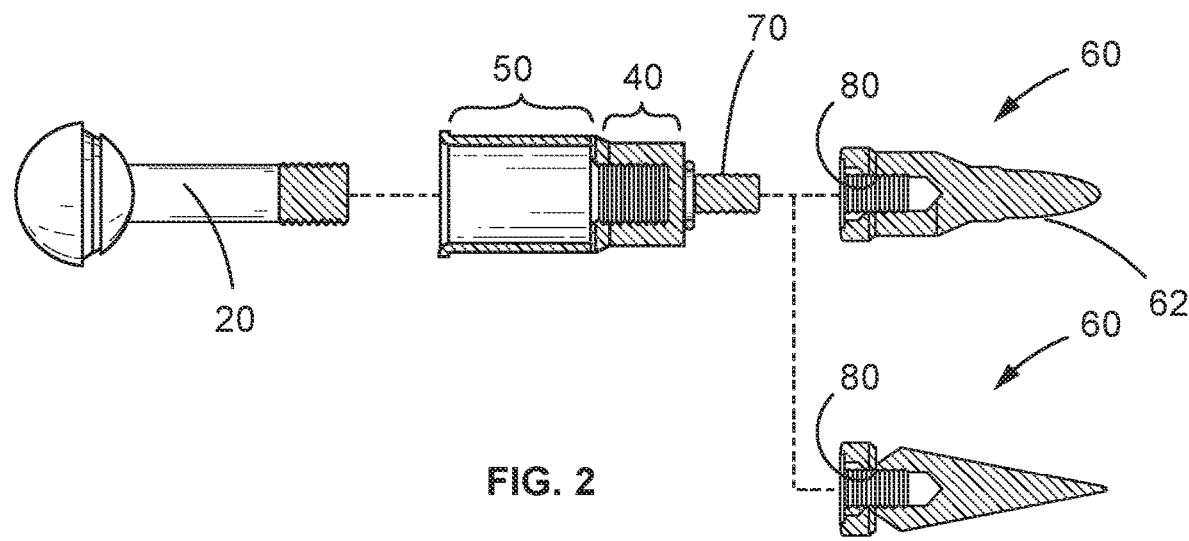
FIG. 2 is an exploded cross-sectional view of a second embodiment of the invention taken through a longitudinal axis of the valve stem cover.
Figure 3:
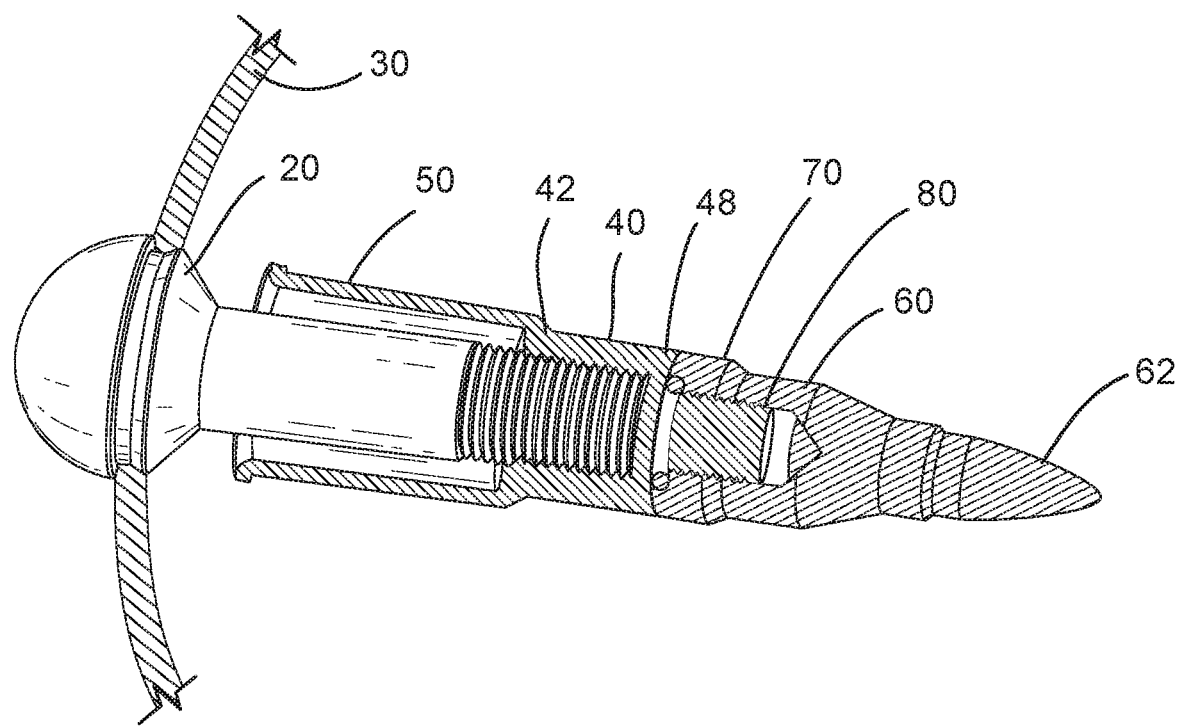
FIG. 3 is a cross-sectional view of the second embodiment as installed on a wheel rim.

In a second embodiment, illustrated in FIGS. 2 and 3, the cylindrical cap 40 includes a threaded shaft 70 projecting upwardly from the top end 48 thereof. The decorative top portion 60 in such an embodiment includes a cooperative threaded aperture 80 in a bottom end 62 thereof. As such the decorative top portion 60 is interchangeable on the cylindrical cap 40. In such an embodiment, the decorative top portion 60 can further include a second skirt 65 (FIG. 5) projecting downwardly from the bottom end 62 to cover at least a portion of the cylindrical cap 40 when the decorative top portion 60 is fully engaged with the threaded shaft 70.

While the threaded shaft 70 and the cooperative threaded aperture 80 represent one type of fastening mechanism that is preferred, clearly the decorative top portion 60 could be attached to the cylindrical cap 40 with some other fastening mechanism known in the art, such as a friction-fit post and recess (not shown), preferably having an elastomeric O-ring contacting the post and recess to increase the force required to overcome friction therebetween. Such a mechanism would allow the user to simply push the decorative top portion 60 onto the post of the cylindrical cap 40 or pull the decorative top portion 60 off of the post of the cylindrical cap 40 without using a turning or screwing action. A pair of strong magnets (not shown), one in the top end 48 of the cylindrical cap 40 and one in the bottom end 62 of the decorative top portion 60 could also be used, for example.

In a third embodiment of the invention, the threaded shaft 70 is replaced with the threaded tire valve 20, such that the cylindrical cap 40 and skirt 50 are threaded onto the threaded tire valve 20 until the skirt 50 contacts the wheel rim 30 or at least covers most of a lower portion of the threaded tire valve 20. The decorative top portion 60 is likewise threaded onto the threaded tire valve 20 until the second skirt 65 covers at least a portion of the cylindrical cap 40, whereby the entire threaded tire valve 20 is covered either by the skirt 50, cylindrical cap 40, second skirt 65, or decorative top portion 60. As such tire valve stems 20 of varying length can be covered by the valve stem cover 10 of the present invention.

While a particular form of the invention has been illustrated and described, it will be apparent that various modifications can be made without departing from the spirit and scope of the invention. For example, the cylindrical cap 40 may alternately be hexagonal in shape in cross-section transverse to the longitudinal axis of thereof, or take some other shape. The term cylindrical, therefore, should be read as being generally cylindrical. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A valve stem cover for a threaded tire valve stem projecting through a wheel rim, comprising:
    a cylindrical cap open at a bottom end thereof and threaded on an inside surface thereof, the cylindrical cap adapted for threaded engagement with the threaded tire valve stem;
    a skirt projecting downwardly from the bottom end of the cylindrical cap and adapted to cover substantially all of the threaded tire valve stem that projects through the wheel rim; and
    a decorative top portion projecting upwardly from a top end of the cylindrical cap;
    the cylindrical cap including a threaded shaft projecting upwardly from the top end thereof, and wherein the decorative top portion includes a cooperative threaded aperture in a bottom end thereof, whereby the decorative top portion is interchangeable on the cylindrical cap;
    whereby with the cylindrical cap threadedly fixed with the threaded tire valve stem, the skirt covers substantially the exposed threaded tire valve stem projecting through a wheel rim, protecting the threaded tire valve stem from road hazards.

2. The valve stem cover of claim 1 wherein the decorative top portion includes a knurled surface adapted for facilitating gripping thereof.

3. The valve stem cover of claim 1 wherein the decorative top portion includes a knurled surface adapted for facilitating gripping thereof.

4. The valve stem cover of claim 1 wherein the decorative top portion includes a second skirt projecting downwardly from the bottom end of the decorative top portion that covers the cylindrical cap when the decorative top portion is engaged with the cylindrical cap.

* * * * *